US012181869B2

(12) United States Patent
Lei et al.

(10) Patent No.: US 12,181,869 B2
(45) Date of Patent: Dec. 31, 2024

(54) METHOD AND APPARATUS FOR REMOTE DRIVING A PLURALITY OF VEHICLES IN A PLATOON

(71) Applicant: FORD GLOBAL TECHNOLOGIES, LLC, Dearborn, MI (US)

(72) Inventors: Oliver Lei, Windsor (CA); Somak Datta Gupta, Novi, MI (US); Vladyslav Slyusar, Northville, MI (US); Arpita Chand, Dearborn, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 17/557,405

(22) Filed: Dec. 21, 2021

(65) Prior Publication Data
US 2023/0195105 A1 Jun. 22, 2023

(51) Int. Cl.
*G05D 1/00* (2024.01)
*G05D 1/02* (2020.01)

(52) U.S. Cl.
CPC ......... *G05D 1/0027* (2013.01); *G05D 1/0022* (2013.01); *G05D 1/0278* (2013.01)

(58) Field of Classification Search
CPC ... G05D 1/0027; G05D 1/0022; G05D 1/0278
See application file for complete search history.

(56) References Cited

U.S. PATENT DOCUMENTS

| 9,224,300 | B2 | 12/2015 | Lee et al. |
| 9,928,746 | B1 | 3/2018 | MacNeille et al. |
| 10,571,907 | B2 | 2/2020 | Buttolo et al. |
| 10,854,089 | B2 | 12/2020 | Wendt et al. |
| 11,378,981 | B2* | 7/2022 | Harvey ............... G05D 1/0027 |
| 2011/0093168 | A1* | 4/2011 | Barth ................ B62D 15/0285 701/41 |
| 2016/0171219 | A1* | 6/2016 | Vaughn ................ G06Q 10/00 726/26 |
| 2016/0357188 | A1* | 12/2016 | Ansari ..................... G06T 17/00 |

(Continued)

FOREIGN PATENT DOCUMENTS

WO 2020181480 A1 9/2020

*Primary Examiner* — Rachid Bendidi
(74) *Attorney, Agent, or Firm* — Joseph Zane; Brooks Kushman P.C.

(57) ABSTRACT

A system includes a plurality of vehicles and at least one first processor in a first vehicle and at least one second processor in each other of the plurality of vehicles. The first vehicle wirelessly receives remote driving commands, from a remote computing system, instructing control of the first vehicle and executes the remote driving commands to control the first vehicle in accordance with the remote driving commands. The first vehicle wirelessly broadcasts the remote driving commands, including a location of the first vehicle where a given of the driving commands was executed. The second vehicle wirelessly receives the broadcast remote driving commands, stores the received remote driving commands in sequence, and executes the given of the driving commands when a location of the second vehicle corresponds to the location of the first vehicle where the given of the driving commands was executed.

9 Claims, 4 Drawing Sheets

(56) References Cited

U.S. PATENT DOCUMENTS

| | | |
|---|---|---|
| 2017/0212511 A1 | 6/2017 | Paiva Ferreira et al. |
| 2020/0057453 A1* | 2/2020 | Laws et al. |
| 2022/0063622 A1* | 3/2022 | Jumpertz .............. B60W 10/04 |
| 2022/0105954 A1* | 4/2022 | Li ......................... H04W 76/14 |
| 2023/0294721 A1* | 9/2023 | Nakagawa ............ B60W 50/08 |
| | | 701/301 |

* cited by examiner

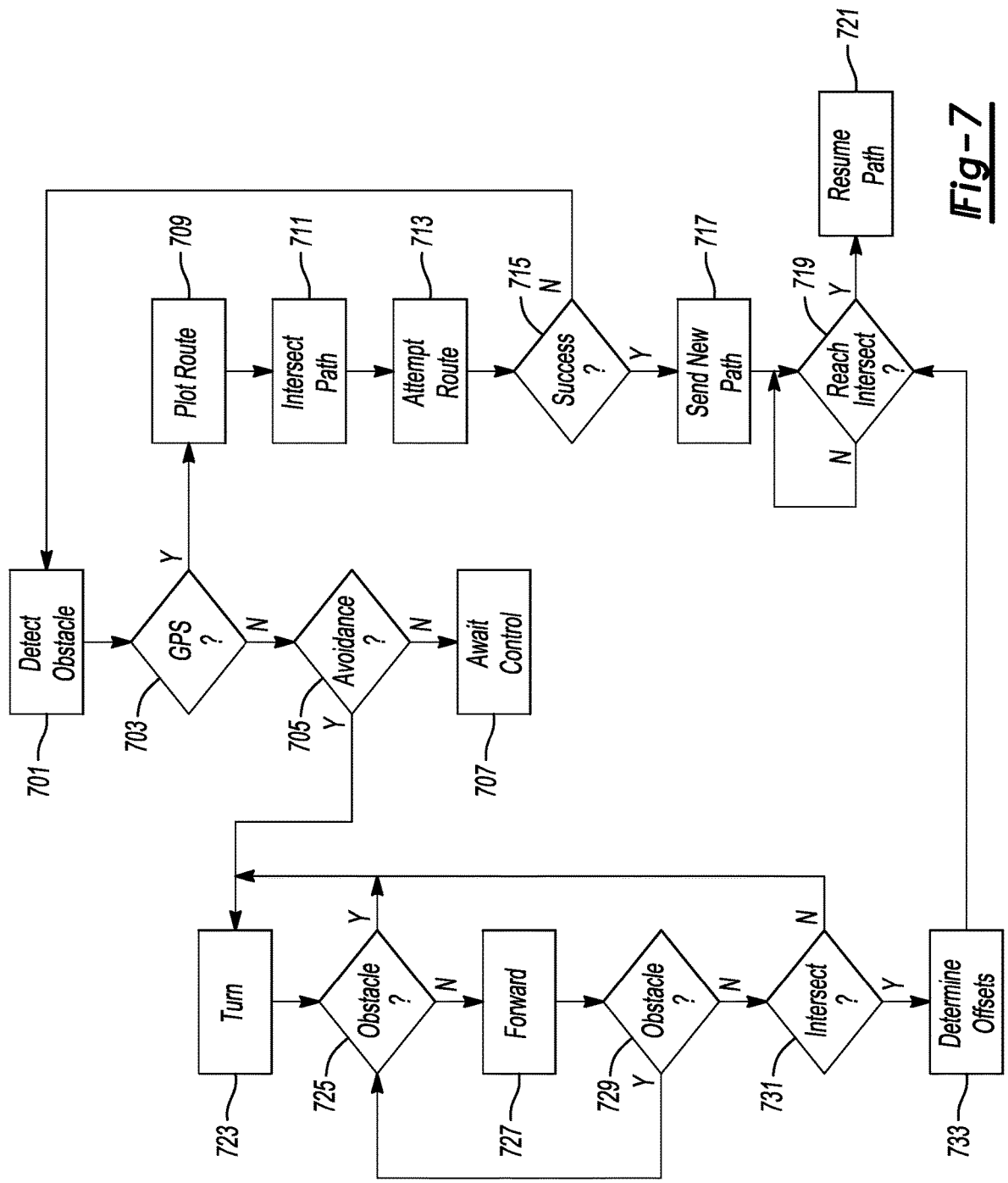

METHOD AND APPARATUS FOR REMOTE DRIVING A PLURALITY OF VEHICLES IN A PLATOON

TECHNICAL FIELD

The illustrative embodiments generally relate to methods and apparatuses for remote driving a plurality of vehicles in a platoon.

BACKGROUND

While vehicles have come a long way in driving-autonomy, in most modern assembly plants an individual human is required to drive each vehicle to a parking space in a storage lot as the vehicle comes off the assembly line. Similarly, if vehicles are to be shipped via freight, a separate person is required to drive each vehicle to the train station or shipping point. This consumes a large amount of human time and resources and may be inefficient when considering the capabilities that can be provided based on vehicle systems and/or infrastructure systems.

SUMMARY

In a first illustrative embodiment, a system includes a plurality of vehicles and at least one first processor in a first vehicle and at least one second processor in each other of the plurality of vehicles. The at least one first processor is configured to wirelessly receive remote driving commands, from a remote computing system, instructing control of the first vehicle, execute the remote driving commands to control the first vehicle in accordance with the remote driving commands, and wirelessly broadcast the remote driving commands, including a location of the first vehicle where a given of the driving commands was executed. The at least one second processor is configured to wirelessly receive the broadcast remote driving commands, store the received remote driving commands in sequence, and execute the given of the driving commands when a location of the other vehicle corresponds to the location of the first vehicle where the given of the driving commands was executed.

In a second illustrative embodiment, a method includes wirelessly receiving a control command at a first vehicle of a plurality of vehicles and executing the control command at a first location of the first vehicle. The method further includes wirelessly broadcasting the control command from the first vehicle, including the first location. The method additionally includes wirelessly receiving the broadcast control command at a second vehicle of the plurality of vehicles, determining that a location of the second vehicle corresponds to the first location and responsively executing the control command in the second vehicle and repeating the wirelessly receiving the control command, executing the control command, wirelessly broadcasting the control command, wirelessly receiving the broadcast control command and determining location correspondence and responsive execution of the control command, for a sequence of control commands received by the first vehicle, until a command indicating a stop is received.

In a third illustrative embodiment, a system includes a plurality of non-transitory storage mediums storing instructions, at least a first non-transitory storage medium of the plurality included in a first vehicle of a plurality of vehicles and at least a second non-transitory storage medium of the plurality included in at least one second vehicle of the plurality of vehicles. Upon execution of the instructions stored by the first non-transitory storage medium by at least one processor of the first vehicle, the at least one processor of the first vehicle is configured to perform a method including wirelessly receiving a control command at a first vehicle of a plurality of vehicles, executing the control command at a first location, wirelessly broadcasting the control command, including the first location and repeating the wirelessly receiving the control command, executing the control command, wirelessly broadcasting the control command, for a sequence of control commands received by the first vehicle, until a command indicating a stop is received. And upon execution of the instructions stored by at least the second non-transitory storage medium by at least one processor of the at least one second vehicle including at least the second non-transitory storage medium, the at least one processor of the second vehicle is configured to perform a method including wirelessly receiving the broadcast control command at a second vehicle of the plurality of vehicles, determining that a location of the second vehicle corresponds to the first location and responsively executing the control command, and repeating the wirelessly receiving the broadcast control command and determining location correspondence and responsive execution of the control command, for a sequence of control commands received by the first vehicle, until a command indicating a stop is received.

BRIEF DESCRIPTION OF THE DRAWINGS

FIG. 7 is an illustrative route-around process.

DETAILED DESCRIPTION

Figure 1:
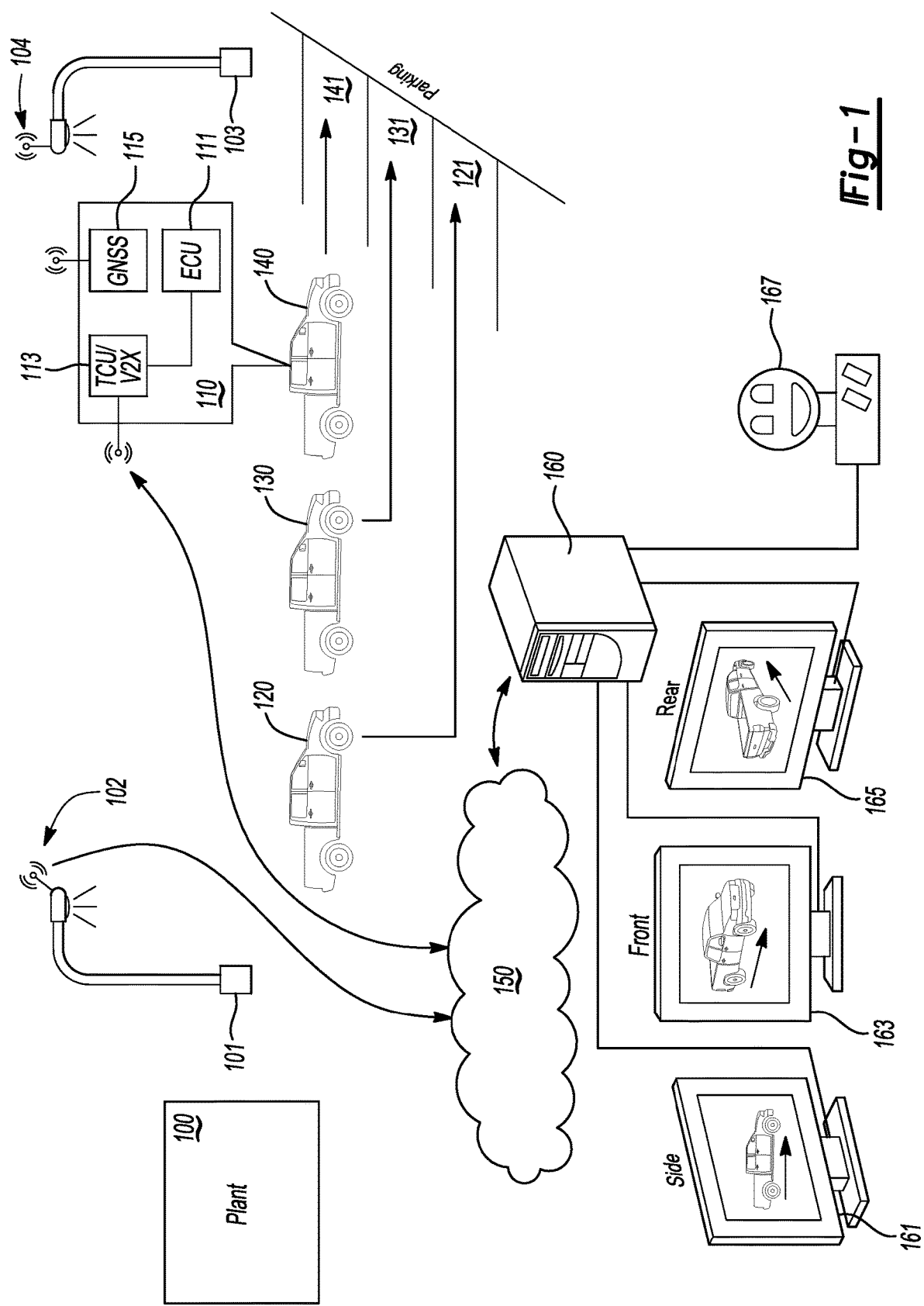
FIG. 1 is an illustrative example of a platoon driving system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose a semi-autonomous driving scenario whereby a group of vehicles is driven in a platoon, with, for example, a human operator controlling a single vehicle in the platoon. The lead or driven vehicle can broadcast commands to other vehicles in the platoon, whereby the whole platoon can move more or less in unison. For example, a lead vehicle can simply repeat its own driving commands to trailing vehicles following in a line, which can then repeat the same order of commands to achieve the same travel path. GPS and onsite cameras, and even trip meters, can be used to assist the remote vehicle and following vehicles. Since the vehicles cannot all park in the same space, offsets for parking can be determined for automatic parking, based on lot layouts, or the remote driver can separately park the vehicles. Even if the platoon is separated due to an inadvertent issue whereby a certain number of the trailing vehicles cannot follow the lead vehicle command, the remote driver can simply pick up with control of the new "lead vehicle" of the remaining smaller platoon and complete the journey.

This allows for a human-guided vehicle to be used in conjunction with semi-autonomous driving systems and/or autonomous driving systems to move multiple vehicles with a single designated driver. If a certain vehicle were highly efficient in autonomy, it could also function as a lead vehicle, even if the trailing vehicles were less capable and could only replicate commands from the lead vehicle. In that embodiment, efficient autonomous lead vehicles could lead other vehicles into the lot in the same manner. A remote human could always watch the process in case there was a break in the pack or the vehicle(s) encountered a situation requiring human assistance, but in general the efficiency of the system can be improved and the overall human resource usage could be decreased.

In one embodiment, a remote user (remote from the lead vehicle) drives a lead vehicle with assistance from multi-access edge computing (MEC) server(s) and strategically placed cameras to drive the lead vehicle to a destination. The driver could potentially actually be driving the lead vehicle as well, but in that instance the driver may have difficulty seeing the remaining vehicles. Nonetheless, the logic of the solution whereby trailing vehicles follow a lead vehicle's commands could still apply in that scenario. The illustrative embodiments are described with respect to the remote-driven lead-vehicle scenario, but it is appreciated that the above described alternatives (human driving lead vehicle, autonomous lead vehicle) and similar scenarios can still utilize aspects of the illustrative embodiments, as will be appreciated by one of skill in the art.

In the non-limiting remote-driving example, each vehicle includes a telematics control unit (TCU) and a V2X (vehicle to X) module, along with a GNSS module for navigation. The vehicles support "drive by wire" remote functionality, which allows driving commands (such as speed and turns) to be sent to vehicle electronic control units (ECUs) via wireless connection.

Along a route (e.g., from the end of an assembly line to a parking lot or from a parking lot to a train station), multiple MEC servers and cameras may be placed to provide adequate views of a platoon being driven in the manners proposed. These cameras can allow for, for example, views of front, back, side, close up, etc. of the platoon, so that the remote driver has good situational awareness of what the whole platoon is doing.

FIG. 1 is an illustrative example of a platoon driving system. An assembly plant 100 produces a group of vehicles 120, 130, 140 to be driven to parking spaces 121, 131, 141 respectively. This process is usable with any reasonable number of vehicles, three are shown merely for illustrative purposes. The path to the parking is provided with a number of MEC servers and cameras 102, 104 which may be affixed to, for example, lighting 101, 103 or other vantage points that provide the appropriate views of the platoon as it is being driven to the destination.

Each vehicle onboard system 110 may include onboard processing and, among other things, a TCU 113 and/or other V2X communication, as well as GNSS tracking capability 115 and a plurality of ECUs 111. Wireless communication between the MEC servers and the vehicle TCUs may flow through the cloud 150 or other communication elements to an end-user driving station 160.

The driving station may be provided with multiple screens 161, 163, 165 showing various views of some or all of the vehicles in the platoon, as well as a forward looking view from the lead vehicle if desired and if the lead vehicle has a camera capable of providing such a view. The user may have a remote control driving station 167 that includes vehicle controls such as a wheel and brake/acceleration, so that the user can drive the vehicle as though the user were actually driving the lead vehicle 140. Those commands can be wirelessly sent to the lead vehicle 140, which can relay the same commands to the following vehicles 130, 120, so that when each trailing vehicle reaches the same coordinate location or travels the same distance, the next-vehicle can make the same manuver.

For example, the lead vehicle 140 may be driven with a speed in a straight line to coordinates X, Y, wherein it changes the speed and makes a right turn and then changes the speed again and travels to X1, Y1. The next vehicle 130 will travel with the same speed preferred or a different speed as the first vehicle along the same straight line until it also reaches X, Y, and then will change the speed and execute the same turn and change the speed again and travel the same path to X1, Y1. Adaptive cruise control and gapping principles will allow the vehicles to avoid collision with each other (e.g., if the lead vehicle is still located at X, Y, the next vehicle 130 will not attempt to occupy X, Y). Since the GPS coordinates and/or distance tracking dictates when the vehicle 130 makes an actual maneuver, an intermittent stop will not interrupt the ability of the vehicle 130 to follow the command sequence. Even if a temporary obstacle were to pass in front of vehicle 130, that (and all subsequent) vehicles 120, etc., could brake and wait for the obstacle to clear and then simply resume the command path. Object detection and other onboard vehicle sensor systems can assist with such automatic avoidance. Heading may also be used, so that there are some assurances that following vehicles 130 are at the same heading as the lead vehicle. If the heading of a following vehicle is slightly askew (e.g., from an alignment issue), instead of turning, for example, 90 degrees, the following vehicle could turn sufficiently to achieve the next appropriate heading for the next set of travel (e.g., 93 degrees or 87 degrees).

When GPS coordinates are unavailable, vehicle travel distances can be used as a proxy, although in that instance it may be more important that the subsequent vehicles 130, 120 are traveling more or less the exact same path as the lead vehicle 140, since the distance the vehicles 130, 120 travel will be the predicate for a manuver. If the driver at station 160 has adequate views of the whole platoon, however, the driver may notice an unexpected deviance and elect to split the platoon at the deviating vehicle 120, for example, and then drive the still-cooperating vehicles 130 along with the lead vehicle, and then return to control of the askew vehicle 120 and drive any remaining platoon using the askew vehicle 120 as a new lead vehicle. This may also be useful if, for example, a vehicle encounters a bump or other physical element that alters its course slightly, which again may cause manuver-predicates of distances-traveled to become slightly off base, depending on the severity of the disruption.

Figure 2:
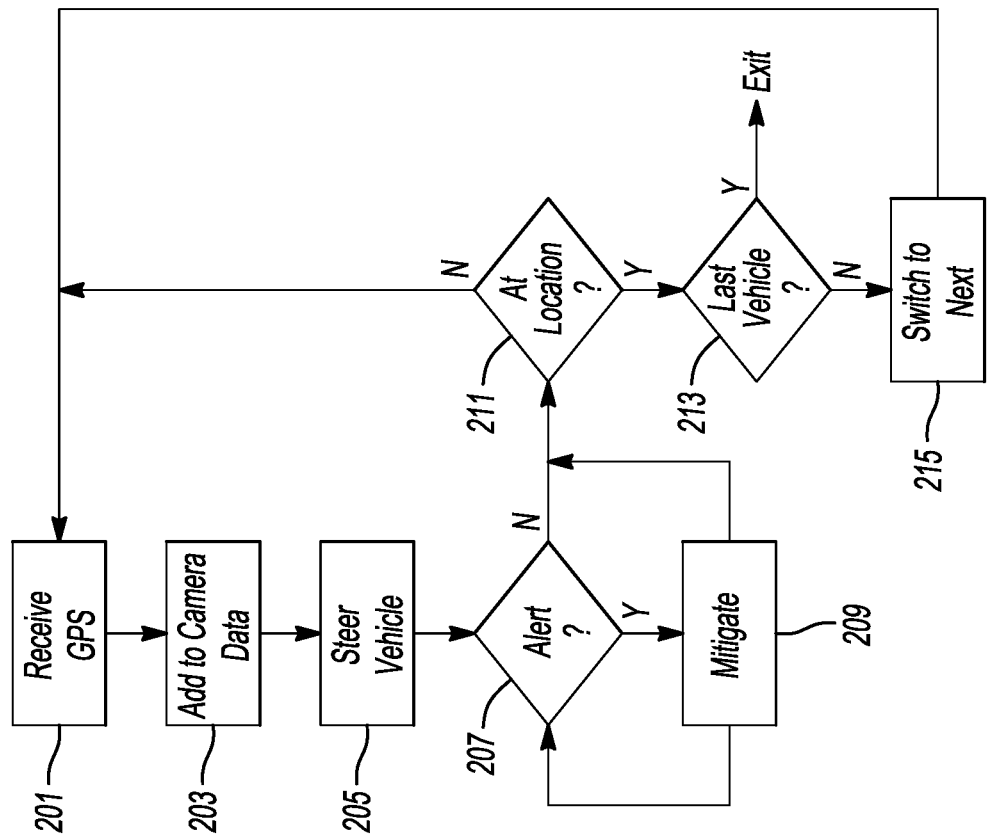
FIG. 2 is an illustrative command execution and relay process.

FIG. 2 is an illustrative command execution and relay process. In this example, the process receives vehicle GPS data from the first or lead vehicle at 201. This is a continual update of the vehicle's GPS or other GNSS location, which can be fed into the MEC server cameras at 203, allowing the cameras to track the vehicle based on knowing where to aim the camera (e.g., an area based on the coordinates). One or more cameras may track the lead vehicle in close view, and/or one or more cameras may show the vehicles from a broader perspective, so the remote driver can be aware of any deviances as well. It is not necessary to drive vehicles at particularly high speeds in many instances, so a driver may be able to have several feeds showing different images and still have time to process those feeds as well as steer the vehicle. Typically, the route will be in an enclosed area, so the occurrence of other vehicles and/or pedestrians should be limited, if not entirely non-existent.

The process receives steering commands from the remote driver at 205 and relays those to the lead vehicle to control the lead vehicle. The communication of those commands to the other vehicles will be discussed in more detail hereinbelow. Alerts, such as those issued by the lead or another vehicle, or issued by any other sensing entity (e.g., an AI associated with the camera feeds), can be received at 207. Alerts can include vehicle sensor data indicating an obstacle, a machine-vision process determining that the line of vehicle is becoming inconsistent, notice that one or more vehicles has ceased moving or is off-heading, etc. Since the lead vehicle has a known path, all other vehicles should pass approximately directly through that same path at the same heading. Gapping should also be relatively consistent between vehicles. A human operator and/or various vehicle sensors and/or image processing logic can ensure that preferred spacing and movement parameters are met. If a vehicle in the platoon encounters an obstacle, is off-heading, passes through an unexpected coordinate, etc., various alerts can allow the remote driver to take mitigating action at 209, which can include automatic mitigation as well as manual mitigation.

Until the vehicle 140 is at a destination location 141 (the parking space, in this example), the process can continue. The process may not know the exact location, but can determine the presence of the vehicle at the location from a signal from the driver and/or, for example, the lead vehicle being placed in park or powered down. If other vehicles remain at 213, the process can move to control of a next lead vehicle 130 at 215. Control of the next vehicle may or may not be necessary based on whether or not the vehicles can be parked or loaded based on an algorithm. If the parking spaces are regularly spaced and located, then it is possible to automatically park all vehicles by following the same path as a lead vehicle, at an offset dictated by the gap between parking spaces—e.g., if all spaces are 6 feet wide, then instead of making the last manuver of turning into the parking space at the same location as the lead vehicle 140, the next vehicle 130 could make the manuver six feet earlier. Since this represents a collision opportunity, GPS coordinates should be highly precise to attempt this based on location alone, although other machine driving systems may also aid in this process. Alternatively, each vehicle can just stop in the approximately correct location to be parked and the user can simply manually drive the vehicles into location.

Since it is possible to store the exact series of movements that resulted in a vehicle moving from a spaced-line into a parked-formation, those vehicles could each enact the inverse of those movements in order to re-establish the spaced line if they need to be moved again later. Each vehicle in a designated group may include storage of the sequence of commands and a group designator, allowing for easy reselection of the same group which can be automatically backed in to the spaced line achieved prior to parking by simply reversing the command sequence for parking. The cloud and/or the remote driving server 160 can also store this information, as well as group and vehicle designations, allowing for faster unparking and regrouping of vehicles 120, 130, 140 if they again need to be moved in a platoon.

Figure 3:
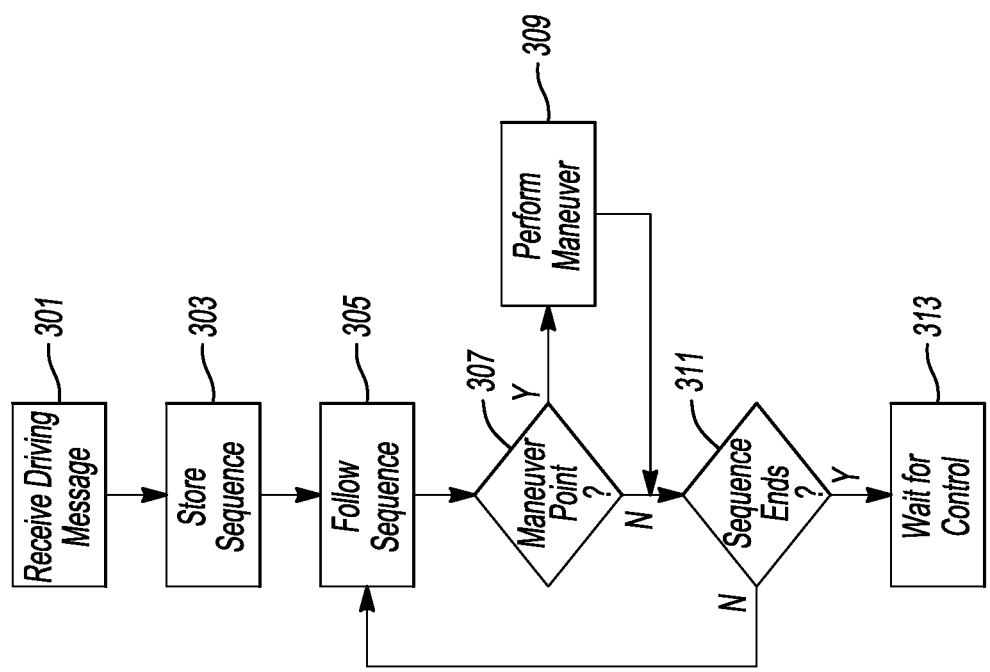
FIG. 3 is an illustrative follow process using coordinate tracking.

FIG. 3 is an illustrative follow process using coordinate tracking. In this illustrative example, the trailing vehicles 120, 130 in a platoon perform the same sequence as the lead vehicle 140 when they reach a location at which the lead vehicle 140 performed a particular manuver. The lead vehicle receives driving commands (e.g., accelerate, turn, brake, etc.) from the driving station 160 and executes those commands as though the lead vehicle were being directly driven.

The lead vehicle 140 also broadcasts the commands to the trailing vehicles 120, 130, which can include the GPS coordinates when the command is broadcast as well as the particular command that was executed at those coordinates. Commands can also include movements such as "maintain speed at X,Y" for when the vehicle is traveling forward. The commands may be broadcast at rapid intervals (e.g., without limitation, 100 ms), allowing for a stream of commands to reach the trailing vehicles 120, 130.

As each trailing vehicle receives the command at 301, it may store a sequence of incoming commands at 303. This is useful for tracking the command sequence as well as providing a backup in case an intermittent vehicle is forced to stop unexpectedly. For example, ice, a slight alignment issue, a bird landing in front of a vehicle, striking an obstacle (pothole/rock) etc. may cause a vehicle to either veer a bit off course or stop. Slight course correction may be automatically achievable, for example, if the vehicles 120, 130 have heading information available as well or recognize a shift in course that was not actively instructed. In other instances, the remote driver may be forced to brake a subset of the vehicles and split the platoon, which can be an automatic or manual decision.

The trailing vehicle(s) follow the sequence at 305, and for each next-command, they determine if they have reached a location associated with the command, where the command was executed, at 307. If they reach a point for a manuver (e.g., turn), they can perform the manuver at 309. Otherwise, they may continue to follow the sequence until the instruction sequence ends at 311. The sequence may end because the remote user stopped controlling the lead vehicle 140, for example, or because the lead vehicle reached a destination location. The vehicles 120, 130 may follow at distances suitable to place them in correct parking position when the lead vehicle stops, or they may follow at greater or lesser distances and perform a gap-up or gap-back technique when the lead vehicle 140 stops. Gapping-up will cause the vehicles 120, 130 to pull into appropriate distance from each other for a parking manuver, and may be useful if the vehicles 120, 130 have been following at a greater distance for safety. Gapping-back may be useful if the vehicles 120, 130 have been following tightly and need to be spaced out for parking or loading reasons. Either manuver can be performed on the basis of sensor data (determining distance to immediately prior vehicle), GPS location data, travel data (distance traveled), etc.

If the sequence ends at 311, the vehicle(s) 120, 130 may wait for direct control or a command to perform a park manuver, which may be the same manuver a lead vehicle performs, except in this instance, if the vehicles 120, 130 are properly gapped, the manuver may be performed at their present location, not the lead vehicle location 140, so that the vehicles park next to each other based on present gapping as opposed to attempting to park on top of each other.

Figure 4:
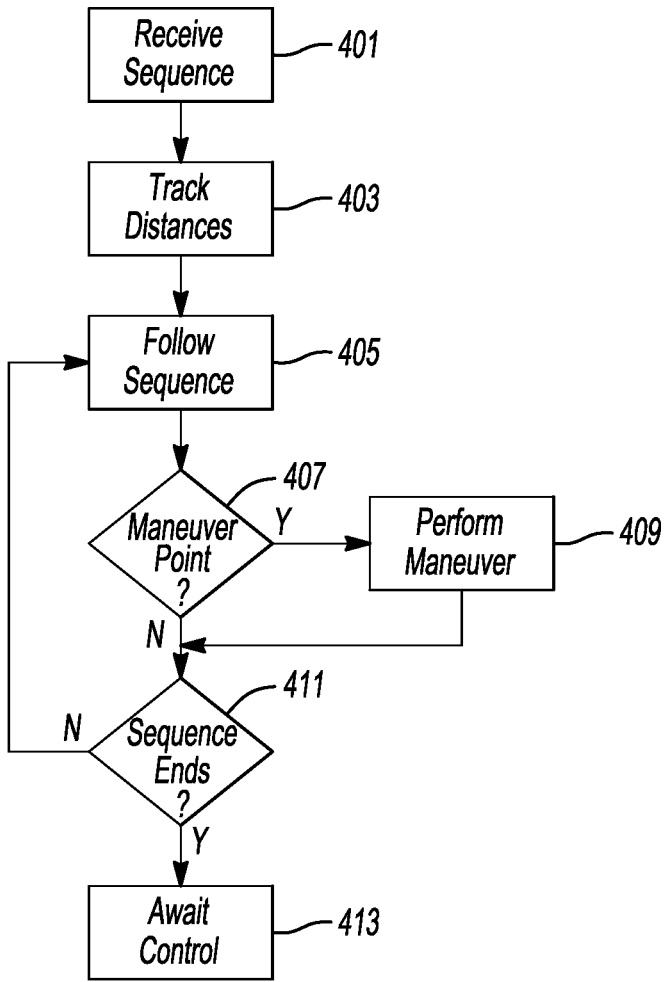
FIG. 4 is an illustrative follow process using distance tracking.

FIG. 4 is an illustrative follow process using distance tracking, such as provided by a trip meter. When the GPS is unavailable, or imprecise due to interference, for example, it may be more accurate to have the vehicles 120, 130, 140 follow in a path and turn after traveling the same distance as the lead vehicle 140 and accommodating for gapping. Since each vehicle has length, and each vehicle has a gap therebetween, trailing vehicles will need to travel the distance of any intervening gaps and intervening vehicles in order to travel the same distance. That is, if a vehicle is ten feet long and a gap is five feet, the first vehicle may travel twenty feet, the second vehicle may travel twenty-five feet (one gap, no intervening), the third vehicle may travel forty feet (two gaps, one intervening vehicle), etc., in order to reach the same location as where the first vehicle (at twenty feet) made a manuver. Uniform gapping can be set with the aid of floor markings and/or vehicle sensors.

As an alternative, each vehicle can have the trip meter triggered as it passes a certain location, for example, a marker (physical and detectable or a very short range radio marker, for example), so that all the vehicles have the same trip meter settings because they do not begin tracking travel distance until they achieve the initial location or tracking-start location of the lead vehicle.

As with the GPS based sequence, the trailing vehicles 120, 130, receive the lead vehicle 140 broadcast sequence at 401. If the vehicle+gap technique is used, each vehicle 120, 130 will track its own distance traveled at 403 to follow the travel sequence at 405, but will use a different calculation at 407 to determine a manuver point, based on which vehicle 120, 130 is doing the tracking, since each will cover a different distance prior to maneuvering. If the "same start point" technique is used, each vehicle will use the same calculation at 407, which is simply reaching the same distance traveled as the lead vehicle 140. Which technique is used may depend on how easy it is to gap certain vehicles at exact distances as opposed to how easy it is to ensure setting of the trip meter to 0 at a precise location.

As before, when a given vehicle 120, 130 reaches the maneuver point at 407, it performs the same maneuver as the lead vehicle 140 performed at that point. This continues until the sequence ends at 411, again signaling a destination or a lack of control commands from the remote driver at station 160. As before, the vehicles can then be individually controlled, gapped up or gapped back if needed, and/or park in unison. Even though the vehicles 120, 130 may be properly gapped and can technically park in unison, they may await a trigger for parking (e.g., a delay or remote command to execute parking) so that the remote driver can monitor each vehicle as it parks, in case any error occurs. Even if the parking is automated based on a lead vehicle, the remote station 160 may always be able to seize control of a particular vehicle. If the time-delay is used (e.g., each vehicle parks 15 seconds after the prior vehicle, doing so automatically), any seizure of remote control of a given vehicle may send a stop command to the remaining vehicles 120, so that they do not attempt to automatically park while a user is manipulating a given vehicle that required direct control.

Further, the vehicles may travel in unison or in delayed sequence, depending on, for example, the gapping, speed, speed of communication and degree of confidence that no unexpected encounters may occur. If the vehicles were initially placed only 1 m apart for example, and intended to move at 10 mph, then were they to travel in unison and were the first vehicle to execute a 90 degree turn, this could result in the second vehicle trying to occupy the geographic location of the first vehicle while the first vehicle was still in that location (since the first vehicle may have to slow to make the turn). Collision avoidance in each vehicle can mitigate this effect, wherein if the gap closes to less than a defined amount, the second vehicle suspends command execution until the gap widens. But slow relay of communication along a longer chain of vehicles could cause a lot of stop and start movement of the chain, as each vehicle would potentially engage collision avoidance (because a prior vehicle stopped) prior to receiving and handling the "stop and delay" command that the second vehicle might generate. Accordingly, while not the necessary solution, it may be advisable to keep the gaps a certain distance (e.g., more than a second vehicle would travel in the time it takes a first vehicle to execute a maximum known turn) or have the vehicles move in a temporal offset (e.g., each delays X seconds before executing a next-command). X can be defined based on the turn execution time, the maximum expected time to receive a new or alternative command from a prior vehicle, and other reasonable factors. In certain instances, a full command sequence for a route may be predefined (e.g., a path from a lot-exit to a loading dock of a train), but if a human or computer is actively driving the first vehicle, an upcoming turn, for example, may not be identified until the first vehicle is actually instructed to take the turn. Accordingly, the next vehicle does not know of the turn, and cannot know of the turn, until the turn is instructed, and so reasonable gapping or delay in execution can avoid stop and start scenarios, even if a collision avoidance system can avoid collision in any event.

Which method of gapping and execution is used may also depend on familiarity and static (or dynamic) nature of a given travel route. A known route with fixed maximum turns that is completely static (devoid of interference) may allow for faster movement, smaller gaps and shorter delays, a more dynamic environment may require careful procession with each vehicle moving slowly with wide gaps to accommodate unexpected stops.

Figure 5:
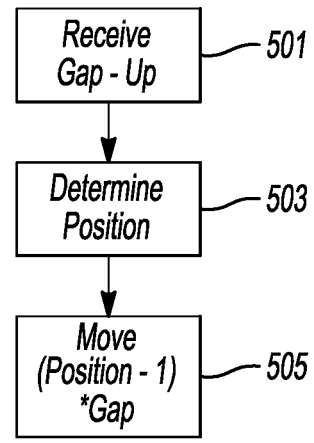
FIG. 5 is an illustrative gap-up process.

FIG. 5 is an illustrative gap-up process. This is an example of a process that may execute to cause vehicles 120, 130 to close up gaps, for parking, for example, or if the vehicles 120, 130, simply need to close a gap. The lead vehicle (the one being controlled) may receive the gap-up instruction. In this example, the lead vehicle 140 is responsible for sending the commands to the trailing vehicles 120, 130, so the command is sent to the lead vehicle, even though the lead vehicle 140 may not move itself. The next vehicle 130, upon receiving the command, closes the distance to a small gap. For example, if the driving gap was ten feet and the parking gap was five feet, the second vehicle 130 would move forward the difference between the current and desired gap. The third vehicle 120, would move twice that distance, with each successive vehicle moving forward an additional difference. If the vehicles 120, 130 have sensors capable of distance detection, those sensors can also be used to aid in the gap up process. Each vehicle 503 determines its place it the platoon at 503, typically designated by an ordered numbering (e.g., lead vehicle is 0, first vehicle is 1, etc.) If the first vehicle is 1, and the next vehicle is 2, then the distance traveled is (platoon number (e.g., 2) minus 1)*distance to travel. Of course, any reasonable ordered sequence can be used, the ultimate goal is to leave the vehicles 120, 130 at the appropriate gaps based on the knowledge of how far each has to travel to achieve the gap. A similar process can be used to expand gaps, by backing up the vehicles in a similar manner, but doing so starting with a rearward vehicle 120 and moving it back sufficiently to expand the gap created to a large enough distance to accommodate the other gap-backs.

Figure 6:
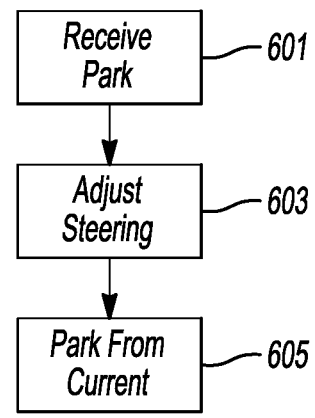
FIG. 6 is an illustrative parking process.

FIG. 6 is an illustrative parking process. This is a command that can be used to park the vehicles 120, 130, for example, if they are already gapped properly and the parking is 45 degree angled parking. Each vehicle receives a park command at 601 from the lead vehicle (or directly from a remote control center 160) and executes the same manuver as the lead vehicle 140 by adjusting the steering position at 603 and parking from its current location at 605. Park assist and other techniques can be used to allow for the vehicles 120, 130 to more precisely park, and again, the parking can be performed in unison, based on some predefined delay, based on the prior vehicle ceasing movement or indicating completion, based on a direct command to park (the command is direct but the parking can be automatic), etc.

FIG. 7 is an illustrative route-around process. As vehicle 120, 130, 140 technology increases, it may even be possible to accommodate intervening obstacles or course-deviances through an automated process. This is merely one example of how a line of vehicles can course correct if an intervening vehicle is off course or if a temporary or unexpected obstacle occurs. The example is provided with respect to an obstacle, but a skilled artisan will appreciate how this technique could be used for course correction as well.

In this example, an intervening vehicle 120 detects an obstacle. For example, an animal may cross the path of the vehicles, or in an incredibly rare instance, a leading vehicle 130 may shed a part or experience a failure and cease movement. While these occurrences are not typical, and while a course for parking vehicles coming from an assembly line will typically be closed. Nonetheless, this is an example of how the remaining vehicle(s) 120 can accommodate the obstacle without direct control.

If the vehicle 120 detects an obstacle (e.g., the preceding vehicle 130 unexpectedly ceases movement), the process determines if this is a GPS based control scheme. If the scheme is based on GPS, the process can plot a proposed coordinate route around the obstacle at 609, and continue to attempt that route until it re-intersects the coordinate path at 611 of the lead vehicle 140. It may require several attempts at 613, based on the size and shape of the obstacle, but if there is sufficient space in the parking lot, at some point the vehicle 120 should be able to reintersect the path of vehicle 140 at the correct heading and resume commands from that location. Since each command from the lead vehicle may have GPS and heading appended thereto, it should be possible for the vehicle 120 to achieve another location on the path with the correct heading, and resume command processing from that point, discarding the intervening, now useless, commands.

The accommodating vehicle 120 sends the new path to the other vehicles (if there were additional trailing vehicles) so they can all follow the successful route to resume the following of the lead. Once the temporary lead vehicle 120 reaches the new path at 619, it resumes the path of the lead vehicle 140 at 621, picking up from the command sequence at that particular location. Other vehicles can take a similar approach, while on-site personnel can be dispatched to address the failed vehicle (in this example) or other obstacle.

If the scheme is not based on GPS at 609, the process may determine if automatic avoidance is to be attempted at 605. This may be slightly trickier avoidance, since there is not a coordinate path that can be plotted as easily for relay to other vehicles, and so it is possible that when GPS is unavailable the following vehicle 120 will simply wait for direct control 607, which may split the platoon and allow the waiting vehicle 120 to serve as a new lead vehicle under direct control.

Otherwise, the vehicle 120 may attempt a slight turn at 623 until forward sensors indicate that no obstacle is present at 625. Once there is a clear path forward as indicated by sensors, the vehicle 120 may slowly proceed forward at 627. If the vehicle 120 continues to detect an obstacle in the path at 629, it may again attempt a turn and forward maneuver, until a path has been established.

Since there is no GPS, geometry may be used to determine when the paths reintersect at 631, based on angles of travel and distances of travel relative to the lead vehicle 140. This can still result in a successful route-around, and it is further accommodative of new obstacles such as other parked vehicles or other obstructions (e.g., a pole) that were not part of the original path. Once the vehicle 120 reintersects the path, the process can determine the travel path for each successive vehicle, such as traveling forward to each successful manuver point of vehicle 120, and completing the full, necessary manuver. Again, geometry may allow for some efficiency here, if the new lead vehicle 120 had to attempt several turns and forward movements, a more efficient path may be determined based on the eventual successful path. Of course, if the projected efficient path includes an obstacle not encountered by the vehicle 120, the next vehicle will be able to accommodate that obstacle in a similar manner. Once a vehicle completes the efficient path without obstacle, it can share that path with the remaining vehicles, which can also follow that path until each vehicle reintersects the lead vehicle 140 path at the correct heading. The heading can be sent from the lead vehicle and/or determined based on geometry. Each vehicle can then resume the lead vehicle path 621.

If vehicles are capable of self-maneuvering around obstacles, it may be possible for the driver of lead vehicle 140 to achieve a safe location with that vehicle, or even complete a route with half a platoon, while the remaining vehicles self manuver around the obstacle (in this case failed vehicle 130). If those vehicles 120 can pick up on the lead path once they have maneuvered around the obstacle, they can finish the route without direct control, allowing the operator to begin moving a new platoon of vehicles. The operator may be able to switch between platoons, so if a vehicle 120 from the old platoon reaches a parking location, it may be able to signal the operator in case the operator wants to oversee the parking. While some vehicles may not be able to achieve this level of autonomy, when they can, it can continue to create efficiency in the rare events of an unexpected obstacle.

In all instances, the remote MEC cameras can be tracking the location of the lead or other vehicles based on the GPS coordinates associated with each vehicle and/or the distances traveled, which allow for tracking of the vehicle by moving the camera within its own reference frame based on how much the vehicle is traveling. A vehicle's route can be compared to a camera field-of-view (e.g., from a top-down perspective) so that the camera is in the correct pose to view the route location that is current or upcoming. While a camera has a 3D field of view, the correct angle and rotation of the camera to view any ground location within its field of view should be knowable. Accordingly, the cameras can be easily adjusted to slightly lead the lead vehicle, view it from behind, view another vehicle traveling the same route, etc. The 2D path of the vehicle can thus be used to aim the cameras, even predictively (e.g., where a vehicle will enter a field of view), even when GPS coordinates are not available.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a plurality of vehicles;
   at least one first processor in a lead vehicle and at least one second processor in each other of the plurality of following vehicles;
   wherein the at least one first processor is configured to:
   wirelessly receive remote driving commands, from a remote server, instructing control of the lead vehicle;
   execute the remote driving commands to control the lead vehicle in accordance with the remote driving commands; and
   wirelessly broadcast the remote driving commands, including a location of the lead vehicle where a given of the driving commands was executed, the broadcast including command parameters defining a maneuver; and
   wherein the at least one second processor is configured to:
      wirelessly receive the broadcast remote driving commands;
      store the received remote driving commands in sequence;
   execute the given of the driving commands when a location of the other following vehicle corresponds to the location of the lead vehicle where the given of the driving commands was executed, wherein, responsive to the wireless command received from the broadcast indicating a stop and park command, the at least one second processor is configured to stop a given of the other following vehicles at an offset location that is offset from a stop location of the first vehicle, associated with the stop command, to preserve gapping between the lead vehicle and the other following vehicles that is determined based on predefined distances between middles of adjacent parking spaces in which the plurality of vehicles will be automatically parked based on a park command; and
   responsive to the stop and park command, execute the stop and park command for the given other following vehicle following stopping at the offset location for the given other vehicle such that successive of the other following vehicles park adjacently in parking spots corresponding to the respective offset locations of the other following vehicles at which the successive of the other following vehicles stopped.

2. The system of claim 1, wherein at least one of the second processors in a second of the other following vehicles is further configured to rebroadcast the received driving commands.

3. The system of claim 2, wherein at least a third vehicle of the other following vehicles receives from the rebroadcast commands from the second of the other following vehicles when the third of the other vehicles is outside a broadcast range of the lead vehicle.

4. The system of claim 1, wherein the location of the lead vehicle and the location of the other following vehicle are determined based on GPS coordinate of the respective vehicles.

5. The system of claim 1, wherein the location of the lead vehicle and the location of the other following vehicle are determined based on a distance traveled by the respective vehicles and wherein the location of the other vehicle corresponds to the location of the lead vehicle based on distance traveled by the other following vehicle being modified by an offset associated with the other following vehicle.

6. The system of claim 5, wherein the offset is a distance between the lead vehicle and the other following vehicle when both vehicles are positioned at a start of a journey represented by the remote driving commands.

7. The system of claim 5, wherein the location of the lead vehicle and the location of the other following vehicle are determined based on a distance traveled by the respective vehicles and wherein the lead vehicle and the other following vehicle begin tracking distance traveled at a same geographic location as either of the respective vehicles reaches the same geographic location.

8. The system of claim 7, wherein the lead vehicle and the other following vehicle receive wireless indication to begin tracking based on a short-range wireless signal received as a respective one of the lead and other following vehicle reaches the geographic location.

9. The system of claim 1, wherein, responsive to the wireless command received from the broadcast indicating a stop command, the at least one second processor is configured to stop a given of the other following vehicles at an offset location that is offset from a stop location of the lead vehicle, associated with the stop command, to preserve gapping between the first vehicle and the other following vehicles that was established at a start of a journey represented by the remote driving commands.

* * * * *